(12) United States Patent
Kinsel

(10) Patent No.: US 8,908,338 B2
(45) Date of Patent: Dec. 9, 2014

(54) METHODS AND APPARATUS FOR MULTI-FREQUENCY GROUND FAULT CIRCUIT INTERRUPT GROUNDED NEUTRAL FAULT DETECTION

(75) Inventor: Hugh T. Kinsel, Sugar Hill, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 447 days.

(21) Appl. No.: 12/792,191

(22) Filed: Jun. 2, 2010

(65) Prior Publication Data

US 2010/0309592 A1    Dec. 9, 2010

Related U.S. Application Data

(60) Provisional application No. 61/183,709, filed on Jun. 3, 2009.

(51) Int. Cl.
    *H02H 3/00*           (2006.01)
    *H02H 9/08*           (2006.01)
    *H02H 3/33*           (2006.01)
    *H02H 7/00*           (2006.01)

(52) U.S. Cl.
    CPC ................................. *H02H 3/331* (2013.01)
    USPC .............................................. 361/42; 361/2

(58) Field of Classification Search
    USPC ........................................................ 361/2, 42
    See application file for complete search history.

(56) References Cited

U.S. PATENT DOCUMENTS

| | | | |
|---|---|---|---|
| 3,614,534 A * | 10/1971 | Gross | 361/45 |
| 4,001,646 A | 1/1977 | Howell | |
| 4,378,579 A | 3/1983 | Hudson, Jr. | |
| 5,844,235 A * | 12/1998 | Tachikawa et al. | 250/227.14 |
| 5,940,256 A * | 8/1999 | MacKenzie et al. | 361/42 |
| 5,999,384 A | 12/1999 | Chen | |
| 8,023,235 B2 * | 9/2011 | Bilac et al. | 361/42 |
| 2006/0068727 A1 * | 3/2006 | Salvi | 455/127.2 |

FOREIGN PATENT DOCUMENTS

| | | |
|---|---|---|
| CN | 1619908 A | 5/2005 |
| DE | 29705030 U1 | 7/1998 |
| EP | 1533880 | 5/2005 |
| EP | 1533880 A1 | 5/2005 |
| FR | 1533880 * | 5/2005 |

OTHER PUBLICATIONS

Translation of Chinese Office Action mailed Dec. 23, 2013 for corresponding Chinese Application No. 201080034729.0 filed Jun. 3, 2010 (27 pages).

* cited by examiner

*Primary Examiner* — Jared Fureman
*Assistant Examiner* — Lucy Thomas

(57) ABSTRACT

In a first aspect, a ground fault circuit interrupt ("GFCI") device is provided for use with an AC power system that includes a line conductor, a neutral conductor and a transformer. The line conductor and the neutral conductor are each coupled between a source and a load, and the neutral conductor is coupled to ground at the source. The transformer includes a first primary winding coupled in series with the line conductor, a second primary winding coupled in series with the neutral conductor, and a secondary winding. The device includes a grounded neutral fault detector circuit coupled to the secondary winding. The grounded neutral fault detector circuit: (a) drives the secondary winding with a multi-frequency AC signal, (b) monitors a multi-frequency load signal in the secondary winding, and (c) provides a first detection signal if the monitored load signal exceeds a predetermined threshold. Numerous other aspects are also provided.

38 Claims, 10 Drawing Sheets

METHODS AND APPARATUS FOR MULTI-FREQUENCY GROUND FAULT CIRCUIT INTERRUPT GROUNDED NEUTRAL FAULT DETECTION

REFERENCE TO RELATED APPLICATIONS

This application claims the benefit of U.S. Provisional Patent Application Ser. No. 61/183,709, filed Jun. 3, 2009, which is incorporated by reference herein in its entirety.

BACKGROUND

This application relates generally to methods and apparatus for ground fault circuit interrupt ("GFCI") detection. More particularly, this application relates to methods and apparatus for GFCI grounded neutral fault detection using multi-tone and/or multi-frequency signals to detect grounded neutral faults in electrical circuit branches of AC power systems.

Electrical circuit branches of single-phase AC power systems typically use electrical cables that include a line conductor and a neutral conductor coupled between a source and a load, with the neutral conductor grounded at the source. GFCI devices are installed in such circuit branches to interrupt power upon detection of ground current faults from the line conductor to ground at the load, as well as grounded neutral faults (e.g., low impedance connection faults) between the neutral conductor and ground at the load. GFCI devices provide safety protection from electrocution, and are primarily used in receptacles in kitchens, bathrooms and outdoor areas where water or moisture can pose a risk of electrocution. GFCI devices are also used in circuit breakers that protect these same areas.

GFCI devices typically use a differential current transformer to sense current imbalances in the line and neutral conductors resulting from ground leakage current from the line conductor returning to the source through an unintended ground circuit path other than the neutral conductor. To prevent injury from electrical shock, the GFCI device must initiate circuit interruption when the current differential in the line and neutral conductors is as low as 5 milliamps.

If a grounded neutral fault occurs, the differential current transformer may not detect the true magnitude of ground leakage current. In particular, because the neutral conductor is typically grounded at the source, a portion of the ground leakage current may return to the source through the neutral conductor. As a result, the current differential in the differential current transformer would not accurately correspond to the actual magnitude of the ground leakage current. Thus, a grounded neutral fault may desensitize the differential current sensor such that the GFCI device would trip only in response to considerably higher ground leakage current levels.

To address this issue, many previously known GFCI devices use a second transformer on the neutral conductor to detect grounded neutral faults. In such devices, if a low impedance connection fault exists between the neutral conductor and ground, the GFCI device forms an oscillator whose output signal is coupled to the differential current transformer using the second transformer. The oscillator signal is then used to detect grounded neutral faults. Upon detection of a grounded neutral fault, the GFCI device interrupts power in the AC power system.

Alternatively, some previously known GFCI devices use a single transformer to detect ground current faults and grounded neutral faults. For example, Howell U.S. Pat. No. 4,001,646, titled "Ground Fault Circuit Interrupter Utilizing A Single Transformer," describes a GFCI device that uses a single transformer to detect ground current faults and grounded neutral faults. In particular, Howell uses a negative resistance network to form an oscillation signal that grows unless a low impedance connection fault exists between the neutral conductor and ground.

Other single-transformer GFCI devices, such as described in co-pending U.S. patent application Ser. No. 12/779,406, filed May 13, 2010, titled "METHODS AND APPARATUS FOR GROUND FAULT CIRCUIT INTERRUPT DETECTION USING A SINGLE TRANSFORMER," which is incorporated by reference herein in its entirety for all purposes, detect grounded neutral faults by driving a single transformer using an AC source (e.g., an AC voltage source), and monitoring load current in the transformer.

In some previously known two-transformer and single-transformer GFCI devices, the oscillator or AC source operate continuously, periodically, or only when a grounded neutral fault occurs. Most previously known GFCI devices use an oscillator or AC source that uses a relatively high, single-frequency AC signal, and a comparator that trips if a threshold level is exceeded. Many such GFCI devices are susceptible to interference signals that may prevent detection of grounded neutral faults, or may be incorrectly detected as grounded neutral faults, unnecessarily interrupting AC power (commonly referred to as nuisance trips).

In particular, an AC power system may have load circuits that produce signals that interfere with GFCI devices. For example, motors (especially variable speed motors), rotary switches in light dimmers or fan speed controls, and fluorescent light fixtures may produce such interference signals. Typically, the interference signals are much higher in frequency than the AC power system frequency of 50 or 60 Hz. The circuitry in GFCI devices used to detect ground leakage current typically includes lowpass filtering that prevents high-frequency interference signals from disrupting the detector. However, a grounded neutral fault detector that uses a higher single-frequency AC signal detection method is susceptible to such high frequency interference signals.

Accordingly, improved GFCI devices are desirable.

SUMMARY

In a first aspect of the invention, a GFCI device is provided for use with an AC power system that includes a line conductor, a neutral conductor and a transformer. The line conductor and the neutral conductor are each coupled between a source and a load, and the neutral conductor is coupled to ground at the source. The transformer includes a first primary winding coupled in series with the line conductor, a second primary winding coupled in series with the neutral conductor, and a secondary winding. The device includes a grounded neutral fault detector circuit coupled to the secondary winding. The grounded neutral fault detector circuit: (a) drives the secondary winding with a multi-frequency AC signal, (b) monitors a multi-frequency load signal in the secondary winding, and (c) provides a first detection signal if the monitored load signal exceeds a predetermined threshold. Numerous other aspects are also provided.

In a second aspect of the invention, a GFCI device is provided for use with an AC power system that includes a line conductor, a neutral conductor and a transformer. The line conductor and the neutral conductor are each coupled between a source and a load, and the neutral conductor is coupled to ground at the source. The transformer includes a first primary winding coupled in series with the line conductor, a second primary winding coupled in series with the neutral conductor, and a secondary winding. The device includes a grounded neutral fault detector circuit coupled to the secondary winding. The grounded neutral fault detector circuit includes: (a) an AC signal source that drives the secondary winding with a multi-frequency AC signal, (b) a detector circuit that monitors a multi-frequency load signal in the secondary winding, and (c) a processor that provides a first detection signal if the monitored load signal exceeds a predetermined threshold.

In a third aspect of the invention, a method for GFCI detection is provided for use with an AC power system that includes a line conductor, a neutral conductor and a transformer. The line conductor and the neutral conductor are each coupled between a source and a load, and the neutral conductor is coupled to ground at the source. The transformer includes a first primary winding coupled in series with the line conductor, a second primary winding coupled in series with the neutral conductor, and a secondary winding. The method includes: (a) for a first predetermined time interval, (i) monitoring a current in the secondary winding, and (ii) providing a first detection signal if the monitored secondary current exceeds a first predetermined threshold; and (b) for a second predetermined time interval, driving the secondary winding with a multi-frequency AC voltage or current; (ii) monitoring a multi-frequency load current in or multi-frequency voltage across the secondary winding; and (iii) processing the multi-frequency drive signal with the multi-frequency monitored signal to determine if a low impedance grounded-neutral fault is less than a second predetermined threshold.

In a fourth aspect of the invention, a GFCI device is provided for use with an AC power system that includes a line conductor, a neutral conductor, a first transformer, and a second transformer. The line conductor and the neutral conductor each are coupled between a source and a load, and the neutral conductor is coupled to ground at the source. The first transformer includes a first primary winding coupled in series with the line conductor, a second primary winding coupled in series with the neutral conductor, and a secondary winding. The second transformer includes a first primary winding coupled in series with the neutral conductor, and a secondary winding. The device includes a multi-frequency signal driver circuit coupled to the secondary winding of the second transformer, and a grounded neutral fault detector circuit coupled to the secondary winding of the first transformer. The multi-frequency signal driver circuit drives the secondary winding of the second transformer with a multi-frequency AC signal. The grounded neutral fault detector circuit includes: (a) a detector circuit that monitors a multi-frequency load signal in the secondary winding of the second transformer, and (b) a processor that provides a first detection signal if the monitored load signal exceeds a predetermined threshold.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

The present invention provides improved GFCI devices that use multi-tone and/or multi-frequency AC signals to detect grounded neutral faults in an AC power system. In particular, GFCI devices in accordance with this invention include a transformer, a ground current fault detector circuit, and a grounded neutral fault detector circuit. For a first predetermined time interval, the ground current fault detector circuit monitors a first current in a secondary winding of the transformer to determine if ground leakage current exceeds a first predetermined threshold. If the first threshold is exceeded, the GFCI device interrupts the AC power system.

During a second predetermined time interval, the grounded neutral fault detector circuit drives the secondary winding of the transformer with a multi-frequency AC signal (e.g., voltage or current), and detects a multi-frequency AC signal (e.g., a load current or induced voltage) in the secondary winding of the transformer to determine if a low impedance ground-to-neutral fault is less than a second predetermined threshold. In particular, the grounded neutral fault detector circuit processes (e.g., mixes or cross-correlates) the multi-frequency drive signal with the detected multi-frequency signal to improve detection in the presence of interference signals and/or noise.

Figure 1:
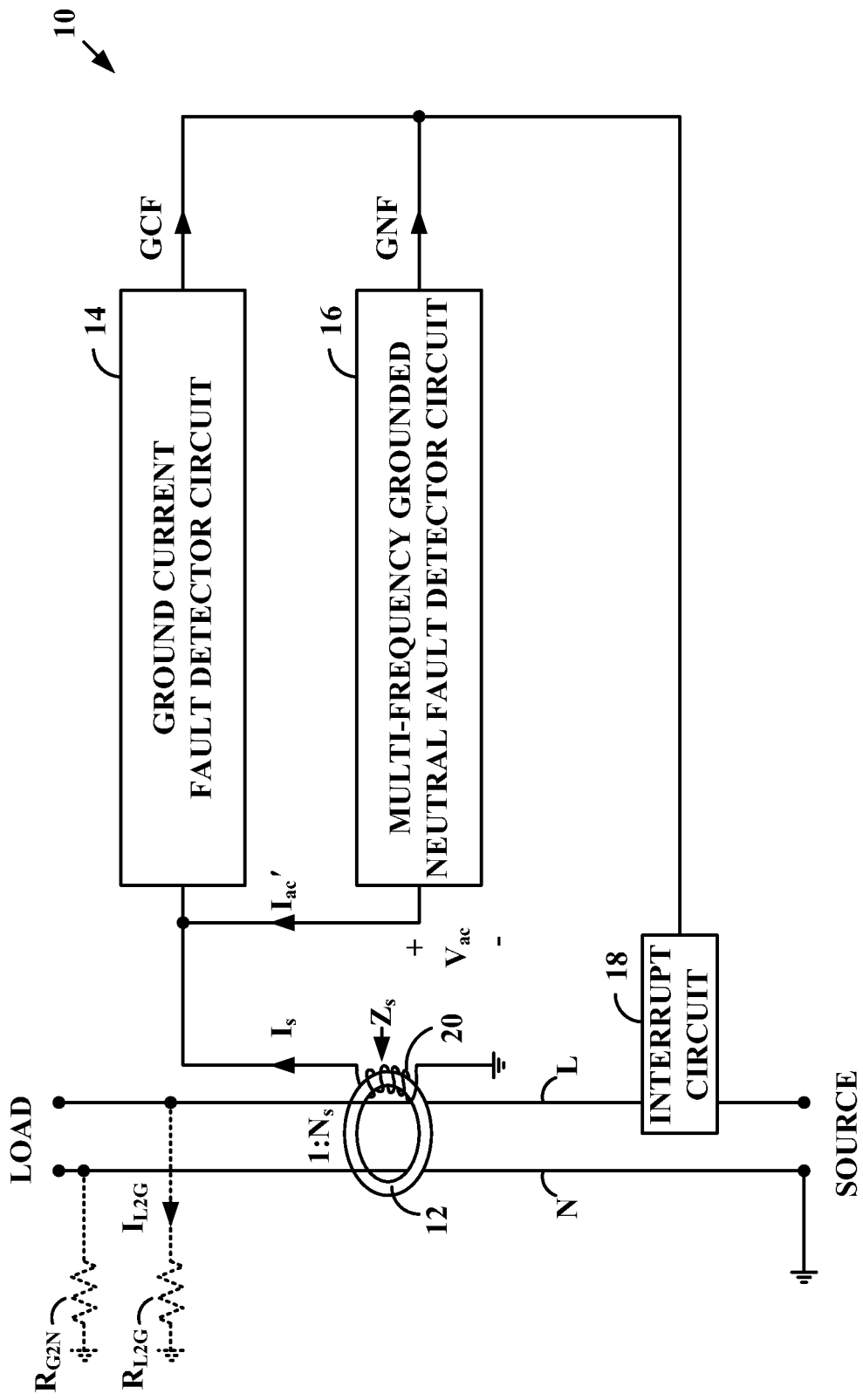
FIG. 1 is a block diagram of an exemplary single-transformer, multi-frequency GFCI device in accordance with this invention.

Referring to FIG. 1, a first exemplary GCFI device in accordance with this invention is described. GFCI device 10 includes a transformer 12, a ground current fault detector circuit 14, a multi-frequency grounded neutral fault detector circuit 16, and an interrupt circuit 18. Transformer 12 is a differential current transformer having a torroidal core and a secondary winding 20. Persons of ordinary skill in the art will understand that other differential current transformers may be used.

A line conductor L and a neutral conductor N of an AC power system pass through the torroidal core of transformer 12 as single-turn primary windings. Persons of ordinary skill in the art will understand that line conductor L and neutral conductor N alternatively may be configured as multiple-turn primary windings of transformer 12. Line conductor L and neutral conductor N are each coupled between a source ("SOURCE") and a load ("LOAD"), and neutral conductor N is coupled to ground at the SOURCE.

Secondary winding 20 is coupled to an input terminal of ground current fault detector circuit 14, and an output terminal of multi-frequency grounded neutral fault detector circuit 16. Secondary winding 20 may be a single winding, having $N_s$ turns, as shown in FIG. 1. Alternatively, secondary winding 20 may include a first secondary winding having $N_{S1}$ turns coupled to an input terminal of ground current fault detector circuit 14, and a second secondary winding having $N_{S2}$ turns coupled to an input terminal of multi-frequency grounded neutral fault detector circuit 16.

In still other embodiments, secondary winding 20 may include a single winding that includes a first tapped output coupled to an input terminal of ground current fault detector circuit 14, and a second tapped output coupled to an input terminal of multi-frequency grounded neutral fault detector circuit 16. Persons of ordinary skill in the art will understand that other similar winding configurations may be used.

In accordance with this invention, GFCI device 10 detects line-to-ground faults at the load, indicated as $R_{L2G}$, and low impedance ground-to-neutral faults at the load, indicated as $R_{G2N}$, by monitoring signals at secondary winding 20 of transformer 12.

In particular, ground leakage current $I_{L2G}$ flowing through a line-to-ground fault $R_{L2G}$ results in a differential current through transformer 12. The differential current causes secondary winding 20 to conduct a current $I_s$ that is related to the ground leakage current $I_{L2G}$ by the inverse of the number of turns $N_s$ on secondary winding 20:

$$I_S = \frac{I_{L2G}}{N_S} \quad (1)$$

Thus, by monitoring secondary current $I_s$, and knowing turns ratio $N_s$, ground leakage current $I_{L2G}$ can be determined from equation (1).

In addition, low impedance ground-to-neutral faults $R_{G2N}$ can be determined by driving secondary winding 20 with a multi-frequency AC signal (e.g., a voltage or current), and monitoring a corresponding load signal (e.g., a current or voltage) at secondary winding 20 of transformer 12.

Low impedance ground-to-neutral fault $R_{G2n}$ appears as a relatively low impedance at secondary winding 20. In particular, assuming that $R_{L2G}$ is much greater than $R_{G2N}$, the impedance $Z_s$ of transformer 12 appears to the secondary as:

$$Z_s = N_s^2 R_{G2N} \quad (2)$$

Thus, if secondary winding 20 is driven with a multi-frequency AC voltage $V_{ac}$, the load current $I_{ac}$ required to drive secondary winding 20 is:

$$I_{ac} = \frac{V_{ac}}{Z_s} \quad (3)$$

Thus, by monitoring load current $I_{ac}$, $R_{G2N}$ can be calculated from equations (2) and (3).

In accordance with this invention, ground fault detector circuit 14 detects ground leakage current $I_{L2G}$ by monitoring differential current in transformer 12. In particular, for a first predetermined time interval T1, ground fault detector circuit 14 monitors current $I_s$ in secondary winding 20. First predetermined time interval T1 may be about 100 milliseconds, more generally between about 1 and 560 milliseconds, although other time intervals may be used. By monitoring secondary current $I_s$, and knowing turns ratio $N_s$, ground leakage current $I_{L2G}$ can be determined from equation (1).

Thus, if monitored secondary current $I_s$ indicates that ground leakage current $I_{L2G}$ has exceeded a first predetermined value, ground current fault detector circuit 14 generates at an output terminal a first detection signal GCF which causes interrupt circuit 18 to open circuit line conductor L and thereby interrupt the AC power system.

For example, the GCF signal may normally be LOW, but may switch from LOW to HIGH if ground leakage current $I_{L2G}$ exceeds the first predetermined value. Persons of ordinary skill in the art will understand that the GCF signal alternatively may normally be HIGH, but may switch from HIGH to LOW if ground leakage current $I_{L2G}$ exceeds the first predetermined value.

After the first predetermined time interval T1, multi-frequency grounded neutral fault detector circuit 16 drives secondary winding 20 with a multi-frequency AC signal for a second predetermined time interval T2 to monitor low impedance ground-to-neutral faults $R_{G2N}$. Second predetermined time interval T2 may be about 5 milliseconds, more generally between about 0.1 and 17 milliseconds, although other durations may be used. For example, for second predetermined time interval T2, multi-frequency grounded neutral detector circuit 16 drives secondary transformer 20 with a multi-frequency AC voltage having a specified magnitude and a specified frequency content.

Figure 2:
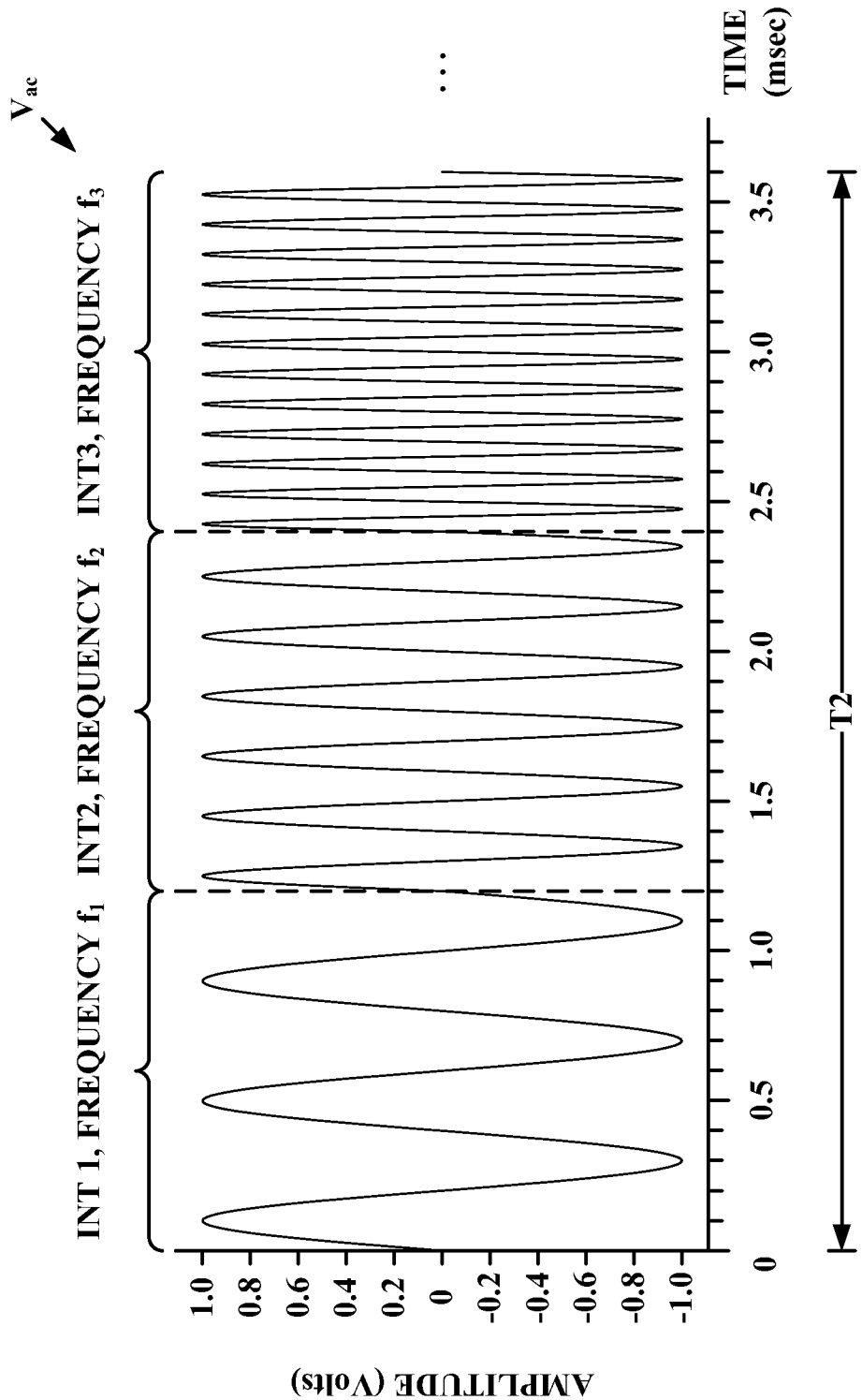
FIG. 2 is a diagram of an exemplary multi-frequency signal for use with GFCI devices in accordance with this invention.

An exemplary multi-frequency AC voltage signal $V_{ac}$ is illustrated in FIG. 2. In the illustrated example, multi-frequency AC voltage signal $V_{ac}$ includes three intervals INT1, INT2 and INT3, with a corresponding unique frequency associated with each interval. Thus, in first interval INT1, voltage signal $V_{ac}$ has a first frequency $f_1$. In second interval INT2, voltage signal $V_{ac}$ has a second frequency $f_2$ different from first frequency $f_1$. In third interval INT3, voltage signal $V_{ac}$ has a frequency $f_3$ that is different from first frequency $f_1$ and second frequency $f_2$.

For example, frequencies $f_1$, $f_2$ and $f_3$ may be 40 kHz, 50 kHz and 60 kHz, respectively, and intervals INT1, INT2 and INT3 may be substantially equal in duration. Intervals INT1, INT2 and INT3 each may be about 1.2 milliseconds, more generally between about 0.03 and 5.6 milliseconds, although other time intervals may be used. Persons of ordinary skill in the art will understand that other waveforms may be used (e.g., square-wave, triangle-wave, and other waveforms), other frequencies may be used, more or fewer than three intervals may be used, and the durations of the intervals need not be equal.

The load current $I_{ac}$ required to drive secondary winding 20 equals multi-frequency AC voltage signal $V_{ac}$ divided by the impedance $Z_s$ of transformer 12, as set forth above in equation (3). From equations (2) and (3), load current $I_{ac}$ may be written as:

$$I_{ac} = \frac{V_{ac}}{(N_s^2 R_{G2N})} \quad (4)$$

Ideally, $R_{G2N}$ is infinite, and load current $I_{ac}$ is zero. However, if a low impedance ground-to-neutral fault exists, $R_{G2N}$ is non-infinite, and may be quite low. As $R_{G2N}$ decreases, load current $I_{ac}$ increases. Thus, by determining load current $I_{ac}$, low impedance ground-to-neutral faults $R_{G2N}$ may be detected.

Ideally, a non-zero current flowing in secondary winding 20 corresponds to load current $I_{ac}$. However, secondary winding 20 may also conduct current $I_{int}$ caused by an interference signal (e.g., from a nearby load, such as a ballast used for fluorescent lighting, a variable speed motor, a rotary dimmer switch, or other similar interference signal), and the interference current may impair detection of load current $I_{ac}$. Thus, the detected load current $I_{ac}'$ may be expressed as:

$$I_{ac}' = I_{ac} + I_{int} \quad (5)$$

where $I_{ac}$ is load current corresponding to a low impedance ground-to-neutral fault $R_{G2N}$, and $I_{int}$ is an unwanted interference signal.

In conventional GFCI devices, the presence of interference signal $I_{int}$ may prevent detection of a low impedance ground-to-neutral fault, or may cause false detection of such faults. In contrast, methods and apparatus in accordance with this invention permit detection of low impedance ground-to-neutral faults in the presence of an interference signal, and substantially reduce false detection of low impedance ground-to-neutral faults as a result of such an interference signal.

In particular, the multi-frequency nature of AC voltage signal $V_{ac}$ facilitates detection of load current $I_{ac}$, even in the presence of interference signal $I_{int}$. Load current $I_{ac}$, like AC voltage signal $V_{ac}$, is a multi-frequency signal. For example, if the exemplary three-interval multi-frequency AC voltage signal $V_{ac}$ illustrated in FIG. 2 is used to drive secondary winding 20 (and assuming linearity), load current $I_{ac}$ will similarly have three intervals, with a corresponding unique frequency associated with each interval. The multi-frequency nature of load current $I_{ac}$ allows the signal to be discriminated from an interference signal $I_{int}$ that may be present in detected load current $I_{ac}'$.

As described in more detail below, numerous techniques may be used to discriminate load current $I_{ac}$ from interference signal $I_{int}$. In one exemplary technique, detected load current $I_{ac}'$ may be mixed with AC voltage signal $V_{ac}$, and the DC component of the mixed output signal may be compared to a predetermined threshold.

For example, if the exemplary multi-frequency AC voltage signal $V_{ac}$ of FIG. 2 is used to drive secondary winding 20, multi-frequency AC voltage signal $V_{ac}$ and load current $I_{ac}$ both will include three intervals, with a corresponding unique frequency $f_1$, $f_2$, and $f_3$ in each interval. If interference signal $I_{int}$ has a frequency $f_{int}$, and if detected load current $I_{ac}'$ is mixed (e.g., multiplied) with multi-frequency AC voltage signal $V_{ac}$, and assuming no phase delay between AC voltage signal $V_{ac}$ and detected load current $I_{ac}'$, the resulting three-interval mixed output signal has the following frequency components:

TABLE 1

Mixed Output Signal Frequency Components

| Interval | $V_{ac}$ | $I_{ac}'$ | $V_{ac} \times I_{ac}'$ |
| --- | --- | --- | --- |
| 1 | $f_1$ | $f_1 + f_{int}$ | $DC + 2f_1 + (f_1 + f_{int}) + (f_1 - f_{int})$ |
| 2 | $f_2$ | $f_2 + f_{int}$ | $DC + 2f_2 + (f_2 + f_{int}) + (f_2 - f_{int})$ |
| 3 | $f_3$ | $f_3 + f_{int}$ | $DC + 2f_3 + (f_3 + f_{int}) + (f_3 - f_{int})$ |

Thus, for each interval, the mixed output signal includes a DC component, plus higher frequency components. If $f_{int}$ does not equal $f_1$, $f_2$ or $f_3$, the DC component in each interval is equal to:

$$DC\ component = \frac{1/2}{(N_s^2 R_{G2N})} \quad (6)$$

If the DC component in an interval exceeds a predetermined threshold signal (indicating that $R_{G2N}$ is less than a second predetermined threshold), a low impedance ground-to-neutral fault may exist. To avoid false positives that may result if $f_{int}$ is close to one or more of $f_1$, $f_2$, or $f_3$, the comparison may be performed for all three intervals. If the DC component exceeds the predetermined threshold in at least two of the three intervals, grounded neutral detector circuit 16 generates at an output terminal a second detection signal GNF, which causes interrupt circuit 18 to open circuit line conductor L and thereby interrupt the AC power system.

For example, the GNF signal may normally be LOW, but may switch from LOW to HIGH if load current $I_{ac}$ exceeds the second predetermined threshold. Persons of ordinary skill in the art will understand that the GNF signal alternatively may normally be HIGH, but may switch from HIGH to LOW if load current $I_{ac}$ exceeds the second predetermined threshold.

In general, AC voltage signal $V_{ac}$ may include M frequency intervals, where M may be 3, 4, 5, . . . , and grounded neutral detector circuit 16 may compare the extracted DC components to a predetermined threshold in each of the M intervals. If the predetermined threshold is exceeded in at least N of the M distinct intervals, where N≤M, grounded neutral detector circuit 16 may generate at an output terminal second detection signal GNF, which causes interrupt circuit 18 to open circuit line conductor L and thereby interrupt the AC power system.

Persons of ordinary skill in the art will understand that multi-frequency grounded neutral detector circuit 16 alternatively may drive secondary winding 20 with a multi-frequency AC current having a specified magnitude $I_{ac}$ and a specified frequency content, and may monitor the drive voltage $V_{ac}$ across secondary winding 20. The monitored drive voltage $V_{ac}$ may be mixed with drive current $I_{ac}$, and the DC component of the resulting output signal may be compared to a predetermined threshold signal in multiple intervals, as described above.

In an alternative exemplary technique in accordance with this invention, cross-correlation techniques may be used to detect low impedance grounded-neutral faults $R_{G2N}$. Such techniques may be useful for discriminating multi-frequency load current $I_{ac}$ from interference plus noise, and may reduce sensitivity to phase differences between multi-frequency AC voltage signal $V_{ac}$ and detected load current $I_{ac}'$.

In a cross-correlation technique, detected load current $I_{ac}'$ is cross-correlated with multi-frequency AC voltage signal $V_{ac}$ to produce a cross-correlation output signal. For example, digital samples of load current $I_{ac}'$ may be cross-correlated with digital samples of multi-frequency AC voltage signal $V_{ac}$. If the cross-correlation output signal exceeds a predetermined threshold, grounded neutral detector circuit 16 may generate at an output terminal second detection signal GNF, which causes interrupt circuit 18 to open circuit line conductor L and thereby interrupt the AC power system.

Figure 3:
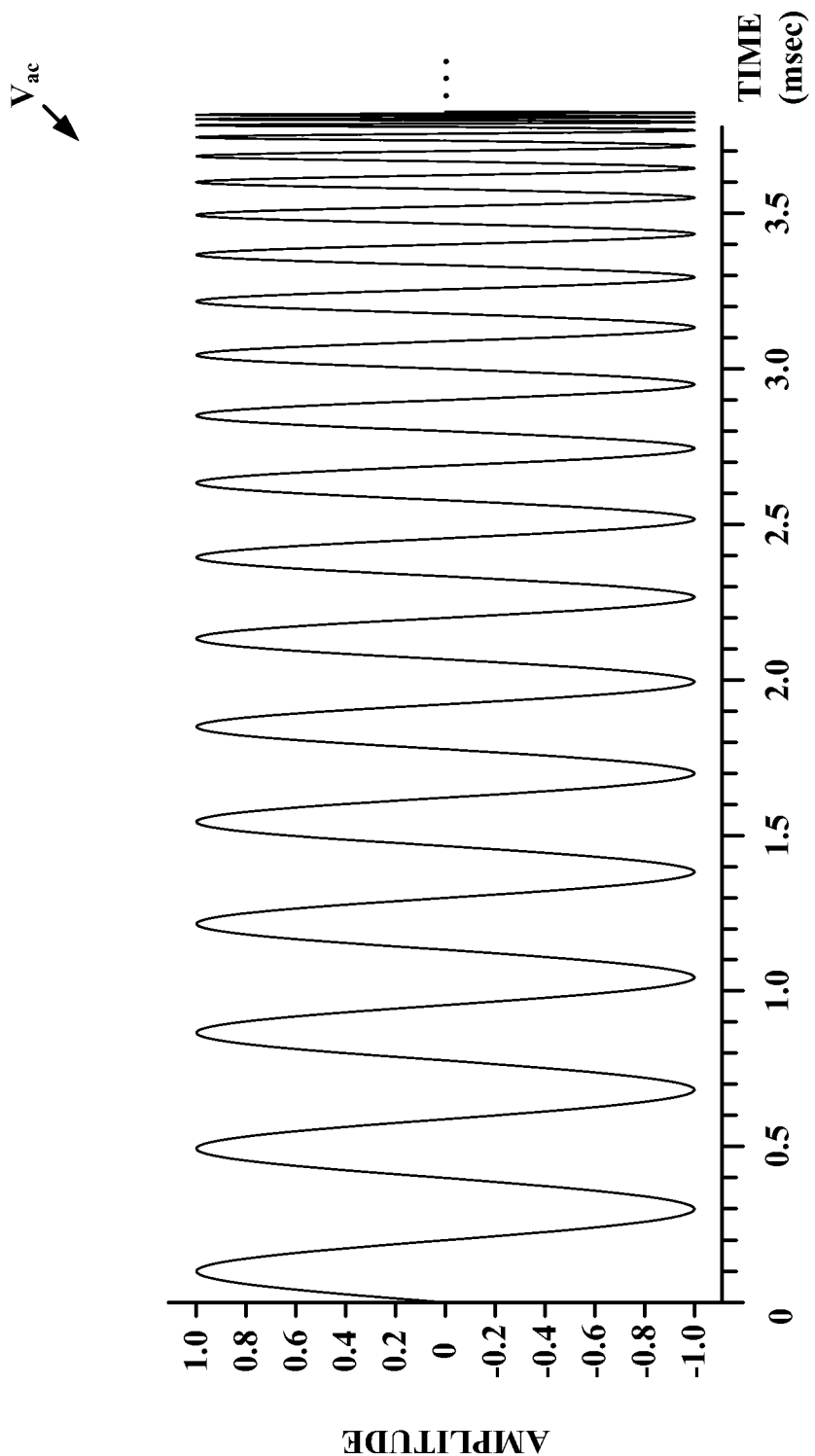
FIG. 3 is a diagram of an alternative exemplary multi-frequency signal for use with GFCI devices in accordance with this invention.

In addition to using cross-correlation techniques, the frequency content of multi-frequency AC voltage signal $V_{ac}$ may be increased, which may further improve detection performance. For example, FIG. 3 shows an alternative exemplary multi-frequency AC voltage signal $V_{ac}$, substantially in the form of a "chirp" signal. A chirp signal changes frequency continuously, and contains an infinite number of frequencies.

Persons of ordinary skill in the art will understand that other similar techniques and other similar multi-frequency AC signals may be used to discriminate multi-frequency load current $I_{ac}$ from unwanted interference and/or noise.

Referring again to FIG. 1, after the second predetermined time interval T2, multi-frequency grounded neutral fault detector circuit 16 ceases driving secondary winding 20, and ground current fault detector circuit 14 resumes monitoring differential current flowing in transformer 12. This process repeats in an iterative manner to continuously detect line-to-ground faults and low impedance ground-to-neutral faults.

Persons of ordinary skill in the art will understand that multi-frequency grounded neutral fault detector circuit 16 alternatively may drive secondary winding 20 with a different AC signal frequency during successive second predetermined time intervals T2. For example, the following is possible:

| | |
|---|---|
| First T1 interval | ground current fault detector circuit 14 monitors differential current flowing in transformer 12 |
| First T2 interval | multi-frequency grounded neutral fault detector circuit 16 drives secondary winding 20 with AC signal at frequency $f_1$ |
| Second T1 interval | ground current fault detector circuit 14 monitors differential current flowing in transformer 12 |
| Second T2 interval | multi-frequency grounded neutral fault detector circuit 16 drives secondary winding 20 with AC signal at frequency $f_2$ |
| Third T1 interval | ground current fault detector circuit 14 monitors differential current flowing in transformer 12 |
| Third T2 interval | multi-frequency grounded neutral fault detector circuit 16 drives secondary winding 20 with AC signal at frequency $f_3$ |
| ... | ... |

As described above, interrupt circuit 18 is used to open circuit line conductor L and thereby interrupt the AC power system based on first and second detection signals GCF and GNF, respectively. In particular, interrupt circuit 18 has a first input terminal coupled to the line conductor L at the SOURCE, a second input terminal coupled to an output terminal of ground current fault detector circuit 14 and to an output terminal of multi-frequency grounded neutral fault detector circuit 16, and an output terminal coupled to the line conductor L primary winding of transformer 12.

The first input terminal is normally coupled to the output terminal of interrupt circuit 18 unless the signal at the second input terminal has a predetermined value (e.g., HIGH). Thus, if GCF and GNF are both LOW, the line conductor L at the SOURCE is coupled to the line conductor L primary winding of transformer 12. If GCF or GNF go HIGH (indicating a ground current fault or a grounded neutral fault, respectively), the line conductor L at the SOURCE is disconnected from the line conductor L primary winding of transformer 12.

Persons of ordinary skill in the art will understand that interrupt circuit 18 alternatively may be located between transformer 12 and the LOAD. In such an alternative embodiment, if GCF and GNF are both LOW, the line conductor L primary winding of transformer 12 is coupled to the line conductor L at the LOAD. If GCF or GNF go HIGH (indicating a ground current fault or a grounded neutral fault, respectively), the line conductor L primary winding of transformer 12 is disconnected from the line conductor L at the LOAD.

Figure 4:
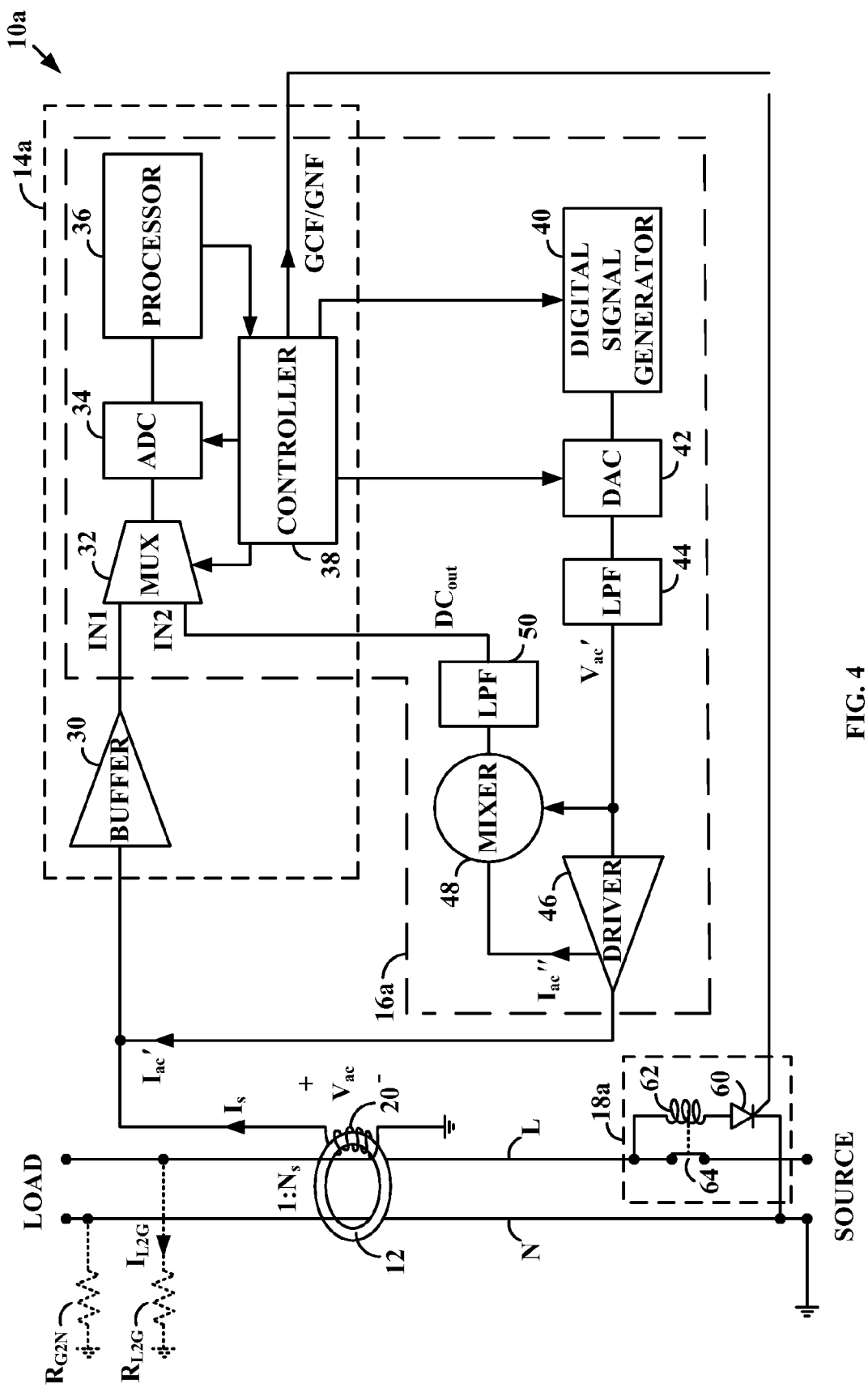
FIG. 4 is a more detailed block diagram of an exemplary single-transformer, multi-frequency GFCI device in accordance with this invention.

GFCI devices in accordance with this invention, such as GFCI device 10, may be implemented in digital circuitry, in analog circuitry, or a combination of digital and analog circuitry. Referring now to FIG. 4, an exemplary GCFI device 10a implemented using digital circuitry is described. GFCI device 10a includes transformer 12, ground current fault detector circuit 14a, multi-frequency grounded neutral fault detector circuit 16a, and interrupt circuit 18a.

Exemplary ground current fault detector circuit 14a includes a buffer (or amplifier) 30 (referred to herein as "buffer/amp 30"), a multiplexor ("MUX") 32, an analog-to-digital converter ("ADC") 34, a processor 36 and a controller 38. Controller 38 may be a microprocessor or other similar controller circuit. Buffer/amp 30 has an input terminal coupled to secondary winding 20, and an output terminal coupled to a first input terminal IN1 of MUX 32. MUX 32 has a second input terminal IN2, a control terminal coupled to controller 38, and an output terminal coupled to an input terminal of ADC 34. ADC 34 also has a control terminal coupled to controller 38, and has an output terminal coupled to an input terminal of processor 36.

During first predetermined time interval T1, controller 38 inactivates multi-frequency grounded neutral fault detector circuit 16a, drive signal $V_{ac}$ is zero and detected load current $I_{ac}'$ is zero. Thus, the output of buffer/amp 30 is the monitored secondary current $I_s$, which is coupled to input terminal IN1 on MUX 32. Controller 38 provides a control signal to MUX 32 to select the IN1 input as the output of MUX 32. ADC 34 samples the buffered (or amplified) secondary current $I_s$ signal and provides a digital count corresponding to secondary current $I_s$ to processor 36.

Processor 36 may be a microprocessor integrated circuit, or other similar processor. Alternatively, ADC 34 and processor 36 may be combined into a single device that includes a microprocessor and analog-to-digital converter, such as such as an ATTINY461A microcontroller by Atmel Corporation, San Jose, Calif., or a MSP430s microcontroller by Texas Instruments Incorporated, Dallas, Tex. Processor 36 processes the converted $I_s$ data to determine if ground leakage current $I_{L2G}$ exceeds the first predetermined threshold.

If ground leakage current $I_{L2G}$ exceeds the first predetermined threshold, processor 36 provides an output signal to controller 38 indicating that a ground current fault exists. Controller 38 in turn provides a first detection signal GCF to interrupt circuit 18a. In the illustrated embodiment, interrupt circuit 18a includes a thyristor 60 coupled to a trip coil 62 and having a control input coupled to controller 38. Interrupt circuit 18a also includes contacts 64 coupled to trip solenoid 62. First detection signal GCF causes thyristor 60 to conduct, which in turn energizes trip solenoid 62, and causes contacts 64 to open, and thereby interrupt the AC power system.

As previously mentioned, during first predetermined time interval T1, controller 38 inactivates multi-frequency grounded neutral fault detector circuit 16a. After first predetermined time interval T1, controller 38 activates multi-frequency grounded neutral fault detector circuit 16a for second predetermined time interval T2.

In particular, multi-frequency grounded neutral fault detector circuit 16a includes a digital signal generator 40 having an output terminal coupled to an input terminal of a digital-to-analog converter ("DAC") 42, a first lowpass filter ("LPF") 44 having an input terminal coupled to an output terminal of DAC 42, a driver 46 having an input terminal coupled to an output terminal of LPF 44, a mixer 48 having an input terminal coupled to an output of driver 46, a second LPF 50 having an input terminal coupled to an output terminal of mixer 48, and MUX 32 having a second input terminal IN2 coupled to an output of LPF 50. Multi-frequency grounded neutral fault detector circuit 16a also includes ADC 34, processor 36 and controller 38, described above.

After first predetermined time interval T1, controller 38 turns ON digital signal generator 40, which provides digital data to DAC 42 to generate an analog output signal having a specified magnitude and frequency content. In accordance with this invention, digital signal generator 40 and DAC 42 may be used to generate a multi-frequency AC signal, such as the exemplary multi-frequency output signal $V_{ac}$ of FIG. 2.

The output of DAC 42 is smoothed by LPF 44, which provides multi-frequency output signal $V_{ac}'$. Driver 46 receives output signal $V_{ac}'$, and drives secondary winding 20 with multi-frequency output signal $V_{ac}$, which substantially equals $V_{ac}'$. In the exemplary embodiment of FIG. 4, multi-frequency grounded neutral fault detector circuit 16a drives secondary winding 20 with a multi-frequency AC voltage $V_{ac}$, and monitors detected load current $I_{ac}'$ conducted by secondary winding 20.

In particular, driver 46 may include a current mirror that provides a mirrored load current $I_{ac}''$ that is substantially equal to detected load current $I_{ac}'$. Mixer 48 mixes mirrored load current $I_{ac}''$ with multi-frequency output signal $V_{ac}'$ to provide a mixed output signal that is filtered by LPF 50.

Figure 5:
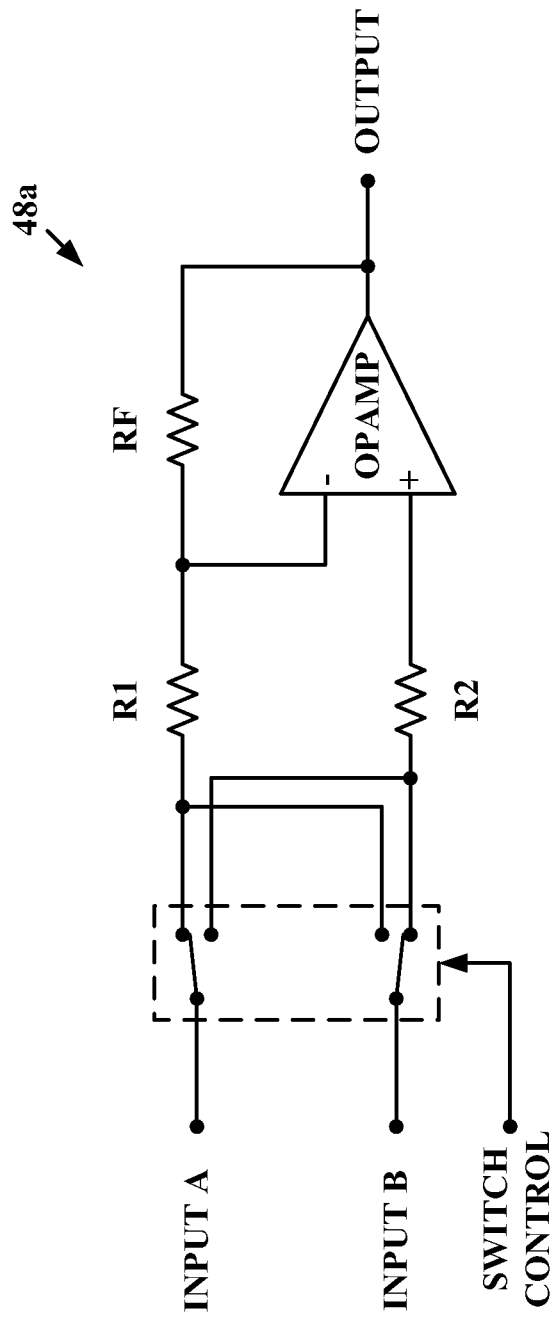
FIG. 5 is an exemplary full-wave rectifier mixer for use with the exemplary device of FIG. 4.

Mixer 48 may be any conventional mixer circuit. For example, mixer 48 may be a switched full-wave rectifier mixer, such as exemplary switched full-wave rectifier mixer 48a illustrated in FIG. 5. In particular, mixer 48a includes an amplifier having inverting and non-inverting input terminals INPUT A and INPUT B, respectively. Mirrored load current $I_{ac}''$ may be coupled to INPUT A and INPUT B, and the switches may alternately switch the inverting and non-inverting inputs at zero crossings of multi-frequency output signal $V_{ac}'$. Persons of ordinary skill in the art will understand that other mixer circuits may be used.

Referring again to FIG. 4, multi-frequency AC output signal $V_{ac}'$) and mirrored load current $I_{ac}''$ each include three intervals, with a corresponding unique frequency $f_1$, $f_2$, and $f_3$ in each interval. If interference signal $I_{int}$ has a frequency $f_{int}$, and if mirrored load current $I_{ac}''$ is mixed with multi-frequency AC voltage signal $V_{ac}'$, and assuming no phase delay between AC voltage signal $V_{ac}'$ and mirrored load current $I_{ac}''$, the resulting three-interval mixed output signal has the following frequency components:

TABLE 2

Mixed Output Signal Frequency Components

| Interval | $V_{ac}'$ | $I_{ac}''$ | $V_{ac}' \times I_{ac}''$ |
| --- | --- | --- | --- |
| 1 | $f_1$ | $f_1 + f_{int}$ | $DC + 2f_1 + (f_1 + f_{int}) + (f_1 - f_{int})$ |
| 2 | $f_2$ | $f_2 + f_{int}$ | $DC + 2f_2 + (f_2 + f_{int}) + (f_2 - f_{int})$ |
| 3 | $f_3$ | $f_3 + f_{int}$ | $DC + 2f_3 + (f_3 + f_{int}) + (f_3 - f_{int})$ |

Thus, for each interval, the mixed output signal includes a DC component, plus higher frequency components.

The output of mixer 48 is filtered by lowpass filter 50. If LPF 50 has a bandwidth that is much smaller than any of the difference frequencies in Table 2, and if $f_{int}$ does not equal $f_1$, $f_2$ or $f_3$, the output of LPF 50, $DC_{out}$, equals the DC component in each interval, as set forth above in Equation (6). $DC_{out}$ is coupled to the second input IN2 of MUX 32.

During second predetermined time interval T2, controller 38 provides a control signal to MUX 32 to select the IN2 input as the output of MUX 32. ADC 34 samples $DC_{out}$ and provides a digital count corresponding to $DC_{out}$ to processor 36. Processor 36 processes the converted $DC_{out}$ data to determine if the DC component of the mixer output exceeds a predetermined value (indicating that $R_{G2N}$ has decreased below a second predetermined threshold) for at least N out of M intervals (e.g., at least 2 out of 3 intervals).

If $DC_{out}$ exceeds the predetermined value in at least N out of M intervals, processor 36 provides an output signal to controller 38 indicating that a grounded neutral fault exists. Controller 38 in turn provides a second detection signal GNF to interrupt circuit 18a. Second detection signal GNF causes thyristor 60 to conduct, which in turn energizes trip solenoid 62, and causes contacts 64 to open, and thereby interrupt the AC power system.

After the second predetermined time interval T2, controller 38 turns OFF digital signal generator 40, and ground current fault detector circuit 14 resumes monitoring differential current flowing in transformer 12. This process repeats in an iterative manner to continuously detect line-to-ground faults and low impedance ground-to-neutral faults.

Figure 6:
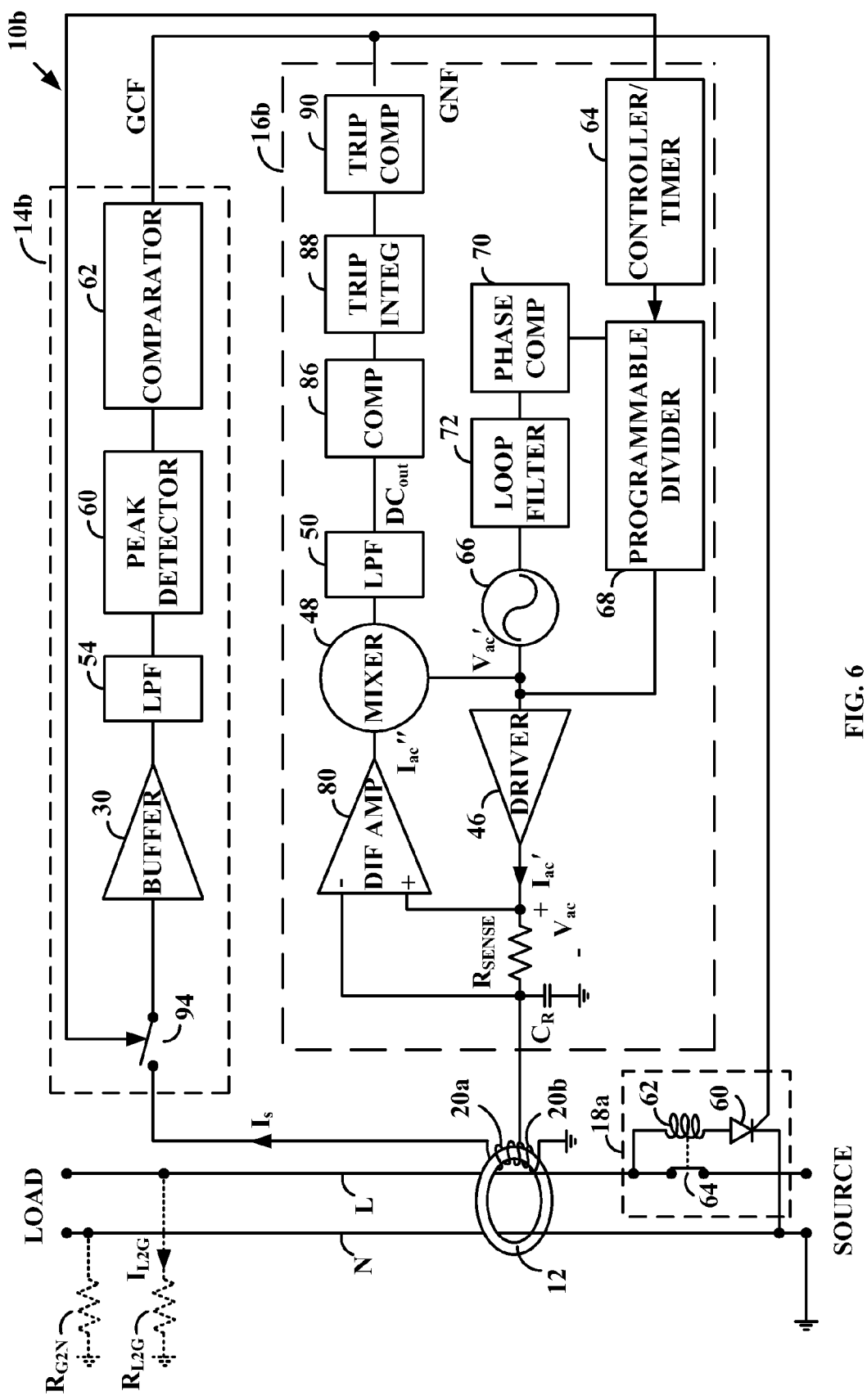
FIG. 6 is a block diagram of an alternative exemplary single-transformer, multi-frequency GFCI device in accordance with this invention.

As previously mentioned, GFCI devices in accordance with this invention alternatively may be implemented using analog circuitry. Referring now to FIG. 6, an exemplary GCFI device 10b implemented using analog circuitry is described. GFCI device 10b includes transformer 12, ground current fault detector circuit 14b, multi-frequency grounded neutral fault detector circuit 16b, interrupt circuit 18a and controlled switch 94. Transformer 12 has a secondary winding 20 having a first tapped output 20a having $N_{sa}$ turns, and a second tapped output 20b having $N_{sb}$ turns.

Exemplary ground current fault detector circuit 14b includes a buffer (or amplifier) 30 (referred to herein as "buffer/amp 30") having an input terminal coupled through controlled switch 94 to secondary winding 20, and has an output terminal coupled to an input terminal of LPF 54. LPF 54 has an output terminal coupled to an input terminal of peak detector 60, which has an output terminal coupled to an input terminal of comparator 62. Comparator 62 has an output terminal coupled to an input terminal of thyristor 60.

During first predetermined time interval T1, a timer circuit (controller/timer 64, described below) closes controlled switch 94, and inactivates multi-frequency grounded neutral fault detector circuit 16b. As a result, drive signal $V_{ac}$ is zero and detected load current $I_{ac}'$ is zero. Thus, the output of buffer/amp 30 is the monitored secondary current $I_s$, which is smoothed by LPF 54, and the smoothed secondary current $I_s$ signal is coupled to the input of peak detector 60. Peak detector 60 provides a DC output voltage equal to the peak value of the secondary current $I_s$. The peak detector output is provided as an input to comparator 62.

Comparator 62 provides an output signal that changes state (e.g., switches from LOW to HIGH) if the peak secondary current $I_s$ has a value exceeding the first predetermined threshold divided by $N_{sa}$ (i.e., if ground leakage current $I_{L2G}$ exceeds the first predetermined threshold). Thus, comparator 62 provides a first detection signal GCF to interrupt circuit 18a. First detection signal GCF causes thyristor 60 to conduct, which in turn energizes trip solenoid 62, and causes contacts 64 to open, and thereby interrupt the AC power system.

As previously mentioned, during first predetermined time interval T1, multi-frequency grounded neutral fault detector circuit 16b is inactive. After first predetermined time interval T1, ground current fault detector circuit 14b is inactive, and multi-frequency grounded neutral fault detector circuit 16b is active for second predetermined time interval T2.

In particular, multi-frequency grounded neutral fault detector circuit 16b includes a differential amplifier 80, a mixer 48, a LPF 50, a comparator 86, a trip integrator 88, a trip comparator 90, a controller/timer 64, an AC signal generator 66, a programmable divider 68, a phase comparator 70, a loop filter 72, a driver 46, a sense resistor $R_{SENSE}$, and a capacitor $C_R$. After first predetermined time interval T1, controller/timer 64 opens controlled switch 94, which effectively inactivates ground current fault detector circuit 14b, and activates AC source 66.

AC source 66 may be an oscillator that provides a multi-frequency AC signal (e.g., an AC voltage or AC current) to driver 46. AC source 66 may generate a sinusoidal signal, or alternatively may generate a non-sinusoidal waveform, such as a square-wave, ramp, or other similar waveform.

In accordance with this invention, AC source 66 generates a multi-frequency AC signal having a specified magnitude and a specified frequency content. In particular, controller/timer 64 may program programmable divider 68, phase comparator 70, loop filter 72 and AC source 66 to produce a multi-frequency AC signal having specified signal frequencies at specified intervals.

In the embodiment shown in FIG. 6, AC source 66 provides a multi-frequency AC voltage signal $V_{ac}'$ to driver 46, which provides a multi-frequency AC output signal $V_{ac}$ (e.g., the exemplary three-interval AC signal $V_{ac}$ of FIG. 2) to second tapped output 20b of secondary winding 20. Thus, during second predetermined time interval T2, multi-frequency grounded neutral fault detector circuit 16b drives secondary winding 20 with a multi-frequency AC voltage signal $V_{ac}$.

Differential amplifier 80 measures the voltage across sense resistor $R_{SENSE}$ to detect load current $I_{ac}'$ supplied by driver 46. $R_{SENSE}$ may have a value of between about 1 and 10 ohms, although other resistance values may be used depending upon the number of turns of the secondary winding, the driver, and sensitivity of the detection circuit. Differential amplifier 80 provides an output sensed load current $I_{ac}''$ to mixer 48. Mixer 48 (such as exemplary mixer 48a of FIG. 5) mixes sensed load current $I_{ac}''$ with multi-frequency AC voltage signal $V_{ac}'$.

Multi-frequency AC output signal $V_{ac}'$ and sensed load current $I_{ac}''$ each include three intervals, with a corresponding unique frequency $f_1$, $f_2$, and $f_3$ in each interval. If interference signal $I_{int}$ has a frequency $f_{int}$, and if sensed load current $I_{ac}''$ is mixed with multi-frequency AC voltage signal $V_{ac}'$, and assuming no phase delay between AC voltage signal $V_{ac}'$ and sensed load current $I_{ac}''$, the resulting three-interval mixed output signal has the following frequency components:

TABLE 3

Mixed Output Signal Frequency Components

| Interval | $V_{ac}'$ | $I_{ac}''$ | $V_{ac}' \times I_{ac}''$ |
| --- | --- | --- | --- |
| 1 | $f_1$ | $f_1 + f_{int}$ | $DC + 2f_1 + (f_1 + f_{int}) + (f_1 - f_{int})$ |
| 2 | $f_2$ | $f_2 + f_{int}$ | $DC + 2f_2 + (f_2 + f_{int}) + (f_2 - f_{int})$ |
| 3 | $f_3$ | $f_3 + f_{int}$ | $DC + 2f_3 + (f_3 + f_{int}) + (f_3 - f_{int})$ |

Thus, for each interval, the mixed output signal includes a DC component, plus higher frequency components.

The output of mixer 48 is filtered by lowpass filter 50. If LPF 50 has a bandwidth that is much smaller than any of the difference frequencies in Table 2, and if $f_{int}$ does not equal $f_1$, $f_2$ or $f_3$, the output of LPF 50, $DC_{out}$, equals the DC component in each interval, as set forth above in Equation (6). $DC_{out}$ is coupled to comparator 86, trip integrator 88 and trip comparator 90.

Comparator 86 provides an output signal that changes state (e.g., switches from LOW to HIGH) if $DC_{out}$ exceeds a predetermined value (indicating that $R_{G2N}$ has decreased below a second predetermined threshold). Trip integrator 88 cumulates the outputs of comparator 86, and trip comparator 90 compares the cumulative output to a predetermined threshold. If $DC_{out}$ exceeds the predetermined value in at least N out of M intervals (e.g., at least 2 out of 3 intervals), trip comparator 90 provides a second detection signal GNF to interrupt circuit 18a. Second detection signal GNF causes thyristor 60 to conduct, which in turn energizes trip solenoid 62, and causes contacts 64 to open, and thereby interrupt the AC power system.

Figure 7:
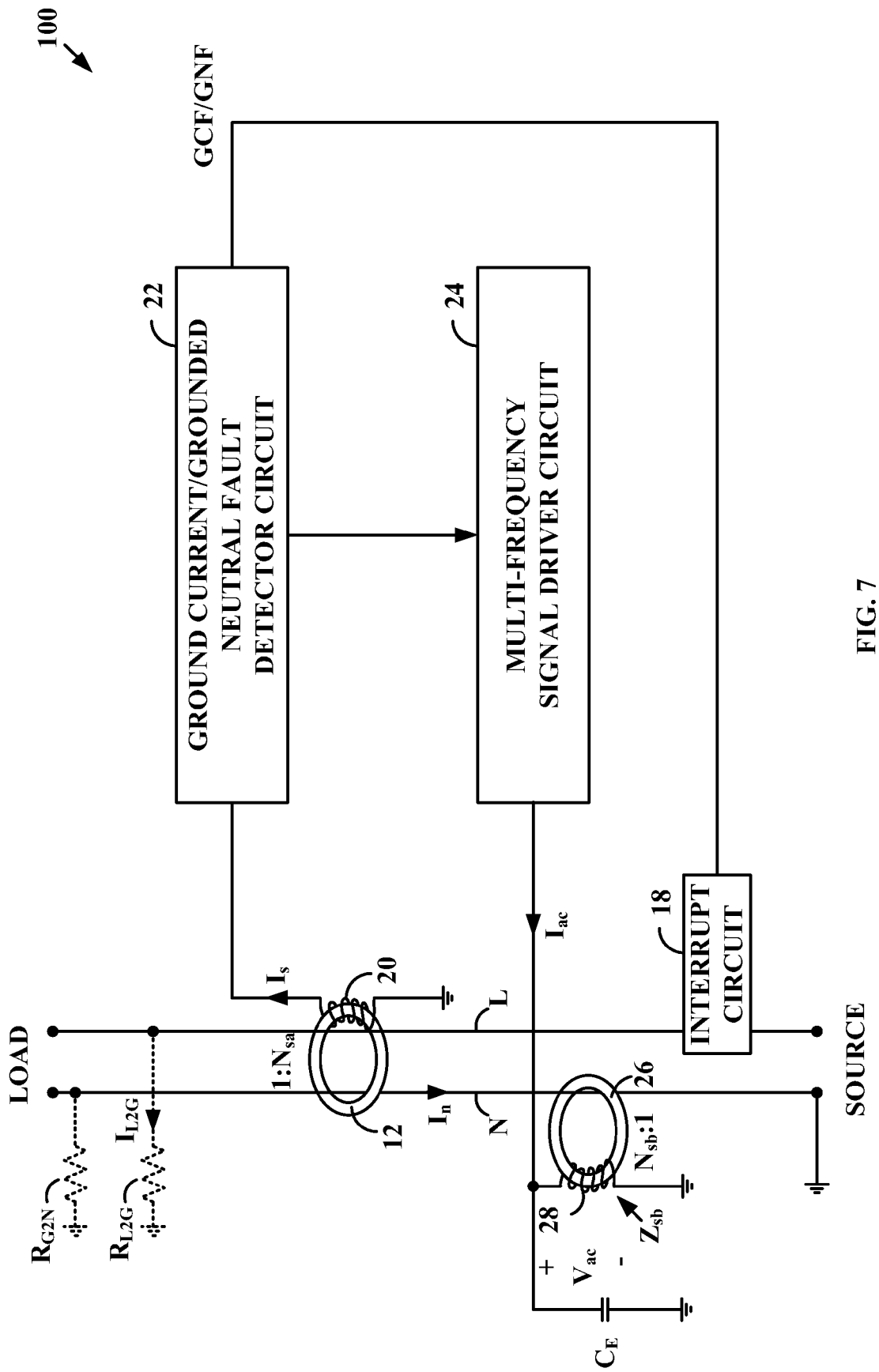
FIG. 7 is a block diagram of an exemplary two-transformer, multi-frequency GFCI device in accordance with this invention.

Methods and apparatus in accordance with this invention may also be used with two-transformer GFCI devices. In particular, referring now to FIG. 7, another alternative exemplary GFCI device 100 in accordance with this invention is described. GFCI device 100 includes a first transformer 12, a ground current/grounded neutral fault detector circuit 14, a multi-frequency signal driver circuit 24, an interrupt circuit 18, and a second transformer 26. Second transformer 26 has a torroidal core and a secondary winding 28. Persons of ordinary skill in the art will understand that other transformers may be used.

Neutral conductor N passes through the torroidal core of second transformer 26 as single-turn primary winding. Persons of ordinary skill in the art will understand that neutral conductor N alternatively may be configured as multiple-turn primary windings of second transformer 26.

Secondary winding 20 is coupled to an input terminal of ground current/grounded neutral fault detector circuit 22. In accordance with this invention, GFCI device 100 detects line-to-ground faults at the load, indicated as $R_{L2G}$, and low impedance ground-to-neutral faults at the load, indicated as $R_{G2N}$, by monitoring signals at secondary winding 20 of first transformer 12.

In particular, ground leakage current $I_{L2G}$ flowing through a line-to-ground fault $R_{L2G}$ results in a differential current through first transformer 12. The differential current causes secondary winding 20 to conduct a current $I_s$ that is related to the ground leakage current $I_{L2G}$ by the inverse of the number of turns $N_{sa}$ on secondary winding 20:

$$I_S = \frac{I_{L2G}}{N_{sa}} \quad (7)$$

Thus, by monitoring secondary current $I_s$, and knowing turns ratio $N_{sa}$, ground leakage current $I_{L2G}$ can be determined from equation (7).

In addition, low impedance ground-to-neutral faults $R_{G2N}$ can be determined by driving secondary winding 28 of second transformer 26 with a multi-frequency AC signal (e.g., a voltage or current), and monitoring a corresponding load signal (e.g., a current or voltage) at secondary winding 20 of first transformer 12.

Low impedance ground-to-neutral fault $R_{G2n}$ appears as a relatively low impedance at secondary winding 28. In particular, assuming that $R_{L2G}$ is much greater than $R_{G2N}$, the impedance $Z_{sb}$ of transformer 26 appears to the secondary as:

$$Z_{sb} = N_{sb}^2 R_{G2N} \quad (8)$$

Thus, if secondary winding 28 is driven with a multi-frequency AC voltage $V_{ac}$, the load current $I_{ac}$ required to drive secondary winding 28 is:

$$I_{ac} = \frac{V_{ac}}{Z_{sb}} \quad (9)$$

This load current is magnetically coupled into neutral conductor N. In particular, neutral conductor N conducts a current $I_n$ that is related to load current $I_{ac}$ by the number of turns on secondary winding 28:

$$I_n = N_{sb} I_{ac} = N_{sb}\left(\frac{v_{ac}}{z_{sb}}\right) = \frac{v_{ac}}{N_{sb} R_{G2N}} \quad (10)$$

Neutral current $I_n$ is magnetically coupled through first transformer 12 to secondary winding 20. In particular, secondary winding 20 conducts a current $I_s$ that is related to neutral current $I_n$ by the inverse of the number of turns $N_{sa}$ on secondary winding 20:

$$I_S = \frac{I_n}{N_{sa}} = \frac{v_{ac}}{N_{sa} N_{sb} R_{G2N}} \quad (11)$$

Thus, by monitoring secondary current $I_s$, and knowing turns ratios $N_{sa}$ and Nsb, $R_{G2N}$ can be calculated from equation (11).

In accordance with this invention, ground current/grounded neutral detector circuit 22 detects ground leakage current $I_{L2G}$ by monitoring differential current in first transformer 12. In particular, for a first predetermined time interval T1, ground current/grounded neutral detector circuit 22 monitors current $I_s$ in secondary winding 20. First predetermined time interval T1 may be about 100 milliseconds, more generally between about 1 and 560 milliseconds, although other time intervals may be used. By monitoring secondary current $I_s$, and knowing turns ratio $N_{sa}$, ground leakage current $I_{L2G}$ can be determined from equation (7).

Thus, if monitored secondary current $I_s$ indicates that ground leakage current $I_{L2G}$ has exceeded a first predetermined value, ground current/grounded neutral detector circuit 22 generates at an output terminal a detection signal GCF/GNF which causes interrupt circuit 18 to open circuit line conductor L and thereby interrupt the AC power system, such as described above.

After the first predetermined time interval T1, multi-frequency signal driver circuit 24 drives secondary winding 28 of second transformer 26 with a multi-frequency AC signal for a second predetermined time interval T2 to monitor low impedance ground-to-neutral faults $R_{G2N}$. Second predetermined time interval T2 may be about 5 milliseconds, more generally between about 0.1 and 17 milliseconds, although other durations may be used. For example, for second predetermined time interval T2, multi-frequency signal driver circuit 24 drives secondary transformer 28 with a multi-frequency AC voltage having a specified magnitude and a specified frequency content, such as the exemplary signals of FIGS. 2 and 3.

For example, if the exemplary multi-frequency AC voltage signal $V_{ac}$ of FIG. 2 is used to drive secondary winding 28, multi-frequency AC voltage signal $V_{ac}$, load current $I_{ac}$, and secondary current $I_s$ of transformer 12 each will include three intervals, with a corresponding unique frequency $f_1$, $f_2$, and $f_3$ in each interval. If interference signal $I_{int}$ has a frequency $f_{int}$, and if detected secondary current $I_s$ is mixed (e.g., multiplied) with multi-frequency AC voltage signal $V_{ac}$, and assuming no phase delay between AC voltage signal $V_{ac}$ and detected secondary current $I_s$, the resulting three-interval mixed output signal has the following frequency components:

TABLE 4

Mixed Output Signal Frequency Components

| Interval | $V_{ac}$ | $I_s$ | $V_{ac} \times I_s$ |
|---|---|---|---|
| 1 | $f_1$ | $f_1 + f_{int}$ | DC + $2f_1$ + ($f_1 + f_{int}$) + ($f_1 - f_{int}$) |
| 2 | $f_2$ | $f_2 + f_{int}$ | DC + $2f_2$ + ($f_2 + f_{int}$) + ($f_2 - f_{int}$) |
| 3 | $f_3$ | $f_3 + f_{int}$ | DC + $2f_3$ + ($f_3 + f_{int}$) + ($f_3 - f_{int}$) |

Thus, for each interval, the mixed output signal includes a DC component, plus higher frequency components. If $f_{int}$ does not equal $f_1$, $f_2$ or $f_3$, the DC component in each interval is equal to:

$$\text{DC component} = \frac{1/2}{(N_{sa} N_{sb} R_{G2N})} \quad (12)$$

If the DC component in an interval exceeds a predetermined threshold signal (indicating that $R_{G2N}$ is less than a second predetermined threshold), a low impedance ground-to-neutral fault may exist. To avoid false positives that may result if $f_{int}$ is close to one or more of $f_1$, $f_2$, or $f_3$, the comparison may be performed for all three intervals. If the DC component exceeds the predetermined threshold in at least two of the three intervals, ground current/grounded neutral fault detector circuit 22 generates at an output terminal a detection signal GCF/GNF, which causes interrupt circuit 18 to open circuit line conductor L and thereby interrupt the AC power system, as described above.

In general, AC voltage signal $V_{ac}$ may include M frequency intervals, where M may be 3, 4, 5, . . . , and ground current/grounded neutral fault detector circuit 22 may compare the extracted DC components to a predetermined threshold in each of the M intervals. If the predetermined threshold is exceeded in at least N of the M distinct intervals, where N≤M, ground current/grounded neutral fault detector circuit 22 may generate at an output terminal detection signal GCF/GNF, which causes interrupt circuit 18 to open circuit line conductor L and thereby interrupt the AC power system.

Persons of ordinary skill in the art will understand that cross-correlation techniques alternatively may be used to detect low impedance grounded-neutral faults $R_{G2N}$, such as described above.

Figure 8:
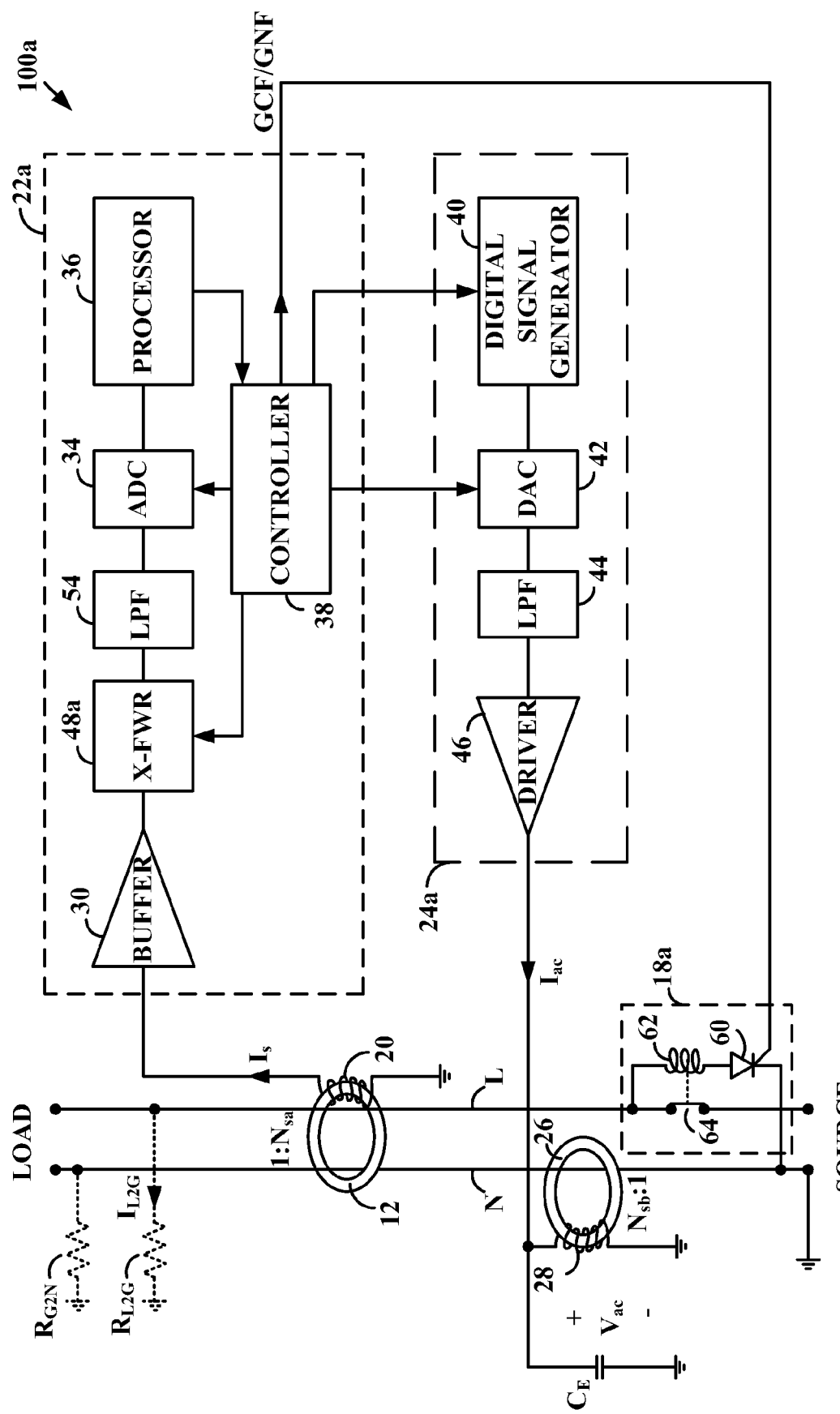
FIG. 8 is a more detailed block diagram of an exemplary two-transformer, multi-frequency GFCI device in accordance with this invention.

GFCI device 100 may be implemented in digital circuitry, in analog circuitry, or a combination of digital and analog circuitry. Referring now to FIG. 8, an exemplary GCFI device 100a implemented using digital circuitry is described. GFCI device 100a includes transformer 12, ground current/grounded neutral fault detector circuit 22a, multi-frequency signal driver circuit 24a, and interrupt circuit 18a.

Exemplary ground current/grounded neutral fault detector circuit 22a includes buffer/amp 30, switched full-wave rectifier mixer 48a, LPF 54, ADC 34, processor 36 and controller 38. During first predetermined time interval T1, controller 38 inactivates multi-frequency signal driver circuit 24a, drive signal $V_{ac}$ is zero and load current $I_{ac}$ is zero. Thus, the output of buffer/amp 30 is the monitored secondary current $I_s$, which passes through full-wave rectifier mixer 48a, sampled by ADC 34, and then processed by processor 36 to determine if ground leakage current $I_{L2G}$ exceeds a first predetermined threshold. If ground leakage current $I_{L2G}$ exceeds the first predetermined threshold, processor 36 provides an output signal to controller 38 indicating that a ground current fault exists. Controller 38 in turn provides detection signal GCF/GNF to interrupt circuit 18a to interrupt the AC power system.

After first predetermined time interval T1, controller 38 activates multi-frequency signal driver circuit 24a for second predetermined time interval T2. Multi-frequency signal driver circuit 24a includes a digital signal generator 40, DAC 42, LPF 44, and driver 46. After first predetermined time interval T1, controller 38 turns ON digital signal generator 40, which provides digital data to DAC 42 to generate an analog output signal having a specified magnitude and frequency content.

In accordance with this invention, digital signal generator 40 and DAC 42 may be used to generate a multi-frequency AC signal, such as the exemplary multi-frequency output signal $V_{ac}$ of FIG. 2. Driver 46 drives secondary winding 28 of second transformer 26 with multi-frequency AC voltage $V_{ac}$, and ground current/grounded neutral fault detector circuit 22a detects secondary current $I_s$, mixes it with multi-frequency output signal $V_{ac}$, and then processes the mixed signal to determine if the DC component exceeds a predetermined threshold in at least N of M intervals (e.g., 2 of 3). If so, ground current/grounded neutral fault detector circuit 22a generates at an output terminal a detection signal GCF/GNF, which causes interrupt circuit 18a to open circuit line conductor L and thereby interrupt the AC power system.

As previously mentioned, alternative exemplary embodiments of this invention use cross-correlation techniques to detect low impedance grounded-neutral faults $R_{G2N}$. Exemplary GFCI devices in accordance with this invention that utilize such cross-correlation techniques are illustrated in FIGS. 9 and 10.

Figure 9:
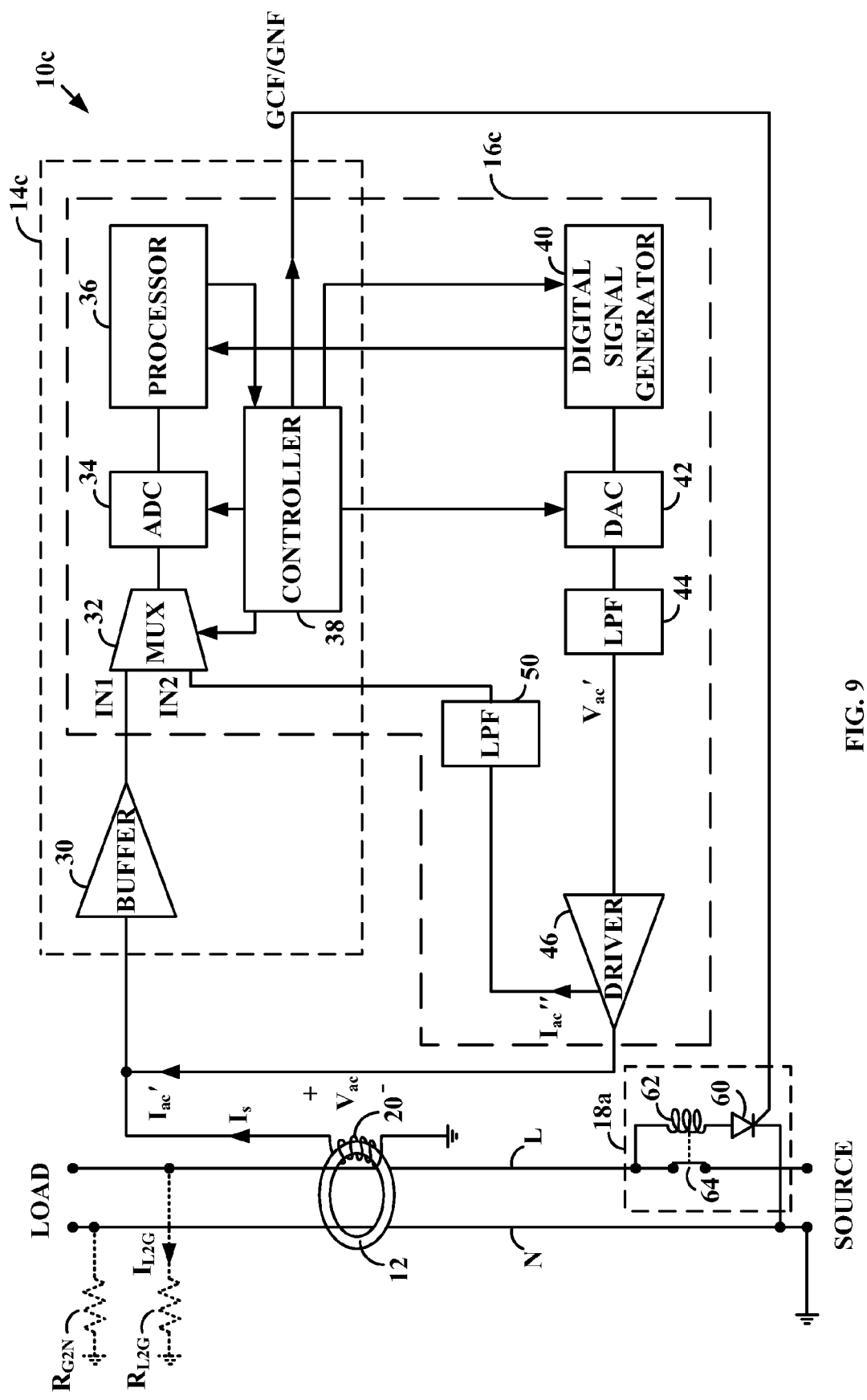
FIG. 9 is a block diagram of another alternative exemplary single-transformer, multi-frequency GFCI device in accordance with this invention.

In particular, FIG. 9 illustrates an exemplary single-transformer GFCI device 10c that is similar to GFCI devices 10a of FIG. 4, but does not include mixer 48. In GFCI device 10c, during second interval T2, processor 36 cross-correlates samples of mirrored load current $I_{ac}"$ with samples of multi-frequency AC voltage signal $V_{ac}$ to produce a cross-correlation output signal. If the cross-correlation output signal exceeds a predetermined threshold, processor 36 provides an output signal to controller 38 indicating that a low impedance grounded-neutral fault exists. Controller 38 in turn provides a second detection signal GNF to interrupt circuit 18a.

Figure 10:
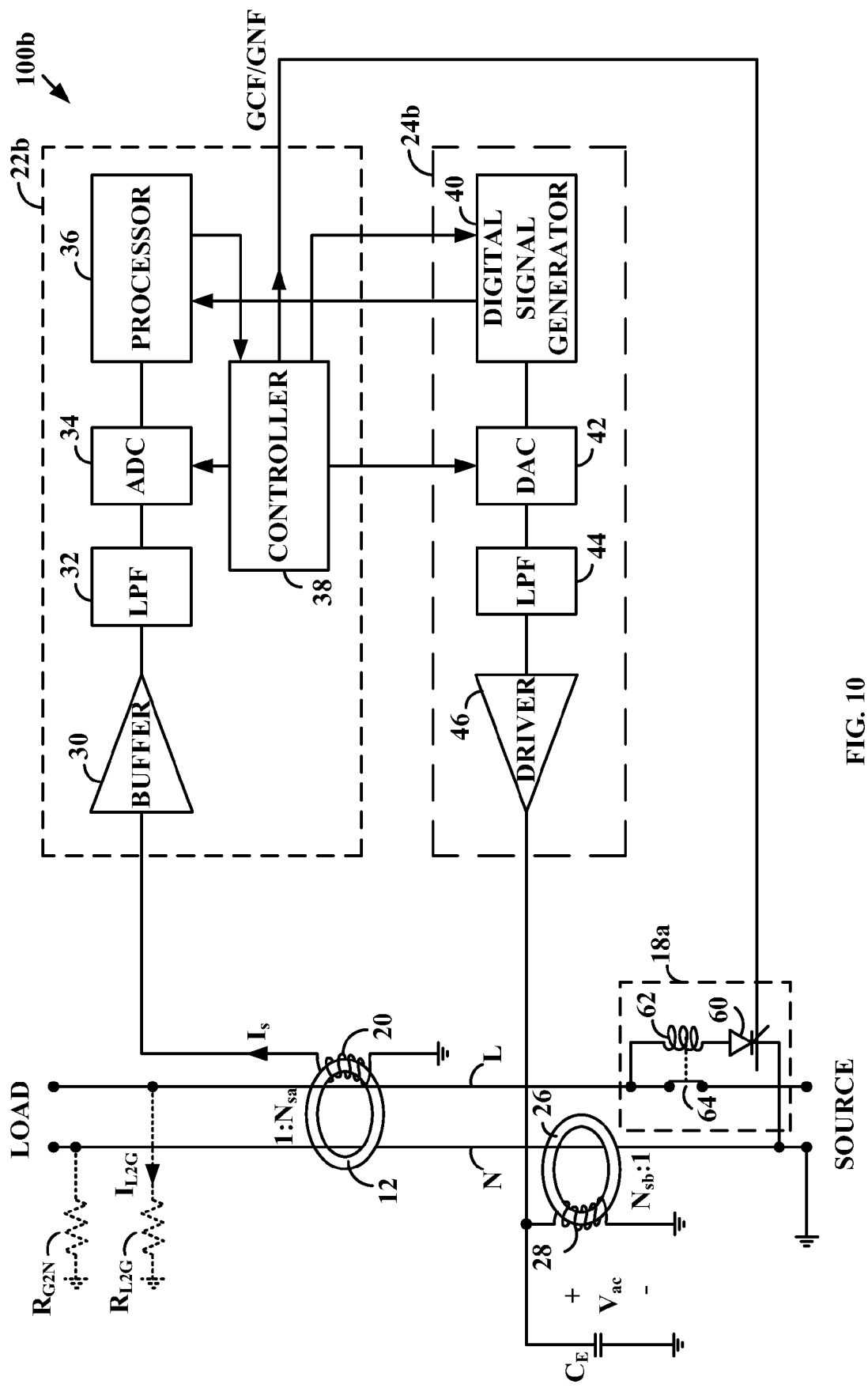
FIG. 10 is a block diagram of an alternative exemplary two-transformer, multi-frequency GFCI device in accordance with this invention.

FIG. 10 illustrates an exemplary two-transformer GFCI device 100b that is similar to GFCI device 100a of FIG. 8, but does not include FWR mixer 48a. In GFCI device 100b, during second interval T2, processor 36 cross-correlates samples of detected secondary current $I_s$ with samples of multi-frequency AC voltage signal $V_{ac}$ to produce a cross-correlation output signal. If the cross-correlation output signal exceeds a predetermined threshold, processor 36 provides an output signal to controller 38 indicating that a low impedance grounded-neutral fault exists. Controller 38 in turn provides a detection signal GCF/GNF to interrupt circuit 18a.

The foregoing merely illustrates the principles of this invention, and various modifications can be made by persons of ordinary skill in the art without departing from the scope and spirit of this invention.

The invention claimed is:

1. A ground fault circuit interrupt ("GFCI") device for use with an AC power system that includes a line conductor, a neutral conductor and a transformer, the line conductor and the neutral conductor each coupled between a source and a load, the neutral conductor coupled to ground at the source, wherein the transformer includes a first primary winding coupled in series with the line conductor, a second primary winding coupled in series with the neutral conductor, and a secondary winding, the device comprising:
a grounded neutral fault detector circuit coupled to the secondary winding, wherein the grounded neutral fault detector circuit comprises: (a) a driver configured to drive the secondary winding with a multi-frequency AC signal, (b) a circuit component configured to monitor a multi-frequency load signal in the secondary winding, (c) a mixer configured to process the multi-frequency AC signal with the monitored multi-frequency load signal to generate a processed signal, (d) a low-pass filter configured to extract a DC signal from the processed signal, and (e) a controller configured to provide a first detection signal if the extracted DC signal exceeds a predetermined threshold.

2. The GFCI device of claim 1, wherein the multi-frequency AC signal comprises a multi-frequency AC voltage signal.

3. The GFCI device of claim 1, wherein the multi-frequency AC signal comprises a multi-frequency AC current signal.

4. The GFCI device of claim 1, wherein the multi-frequency AC signal comprises M intervals, with a corresponding unique frequency in each interval.

5. The GFCI device of claim 4, wherein M is greater than or equal to 3.

6. The GFCI device of claim 4, wherein the grounded neutral fault detector circuit provides the first detection signal if the extracted DC signal exceeds the predetermined threshold in at least N of the M intervals, where N is less than or equal to M.

7. The GFCI device of claim 1, wherein the multi-frequency AC signal comprises a chirp signal.

8. The GFCI device of claim 1, wherein the mixer comprises a switched full-wave rectifier mixer to generate the processed signal.

9. The GFCI device of claim 1, wherein the circuit component configured to monitor the multi-frequency load signal comprises the driver or a differential amplifier.

10. The GFCI device of claim 1, further comprising a ground current fault detector circuit coupled to the secondary winding, wherein the ground current fault detector circuit provides a second detection signal if a current in the secondary winding exceeds a predetermined threshold.

11. The GFCI device of claim 10, further comprising an interrupt circuit coupled to the line conductor, wherein the interrupt circuit interrupts power in the AC power system if the grounded neutral fault detector circuit provides the first detection signal, and/or if the ground current fault detector circuit provides the second detection signal.

12. A ground fault circuit interrupt ("GFCI") device for use with an AC power system that includes a line conductor, a neutral conductor and a transformer, the line conductor and the neutral conductor each coupled between a source and a load, the neutral conductor coupled to ground at the source, wherein the transformer includes a first primary winding coupled in series with the line conductor, a second primary winding coupled in series with the neutral conductor, and a secondary winding, the device comprising:
a grounded neutral fault detector circuit coupled to the secondary winding, wherein the grounded neutral fault detector circuit includes: (a) an AC signal source that drives the secondary winding with a multi-frequency AC signal, (b) a detector circuit that monitors a multi-frequency load signal in the secondary winding, (c) a mixer circuit that processes the multi-frequency AC signal with the monitored multi-frequency load signal to generate a processed signal, (d) a circuit that extracts a DC signal from the processed signal, and (e) a processor that provides a first detection signal if the extracted DC signal exceeds a predetermined threshold.

13. The GFCI device of claim 12, wherein the multi-frequency AC signal comprises a multi-frequency AC voltage signal.

14. The GFCI device of claim 12, wherein the multi-frequency AC signal comprises a multi-frequency AC current signal.

15. The GFCI device of claim 12, wherein the multi-frequency AC signal comprises M intervals, with a corresponding unique frequency in each interval.

16. The GFCI device of claim 15, wherein M is greater than or equal to 3.

17. The GFCI device of claim 15, wherein the grounded neutral fault detector circuit provides the first detection signal if the extracted DC signal exceeds the predetermined threshold in at least N of the M intervals, where N is less than or equal to M.

18. The GFCI device of claim 12, wherein the multi-frequency AC signal comprises a chirp signal.

19. The GFCI device of claim 12, wherein the mixer circuit comprises a switched full-wave rectifier mixer to generate the processed signal.

20. The GFCI device of claim 12, wherein the detector circuit comprises a driver or a differential amplifier.

21. The GFCI device of claim 12, further comprising a ground current fault detector circuit coupled to the secondary winding, wherein the ground current fault detector circuit provides a second detection signal if a current in the secondary winding exceeds a predetermined threshold.

22. The GFCI device of claim 21, further comprising an interrupt circuit coupled to the line conductor, wherein the interrupt circuit interrupts power in the AC power system if the grounded neutral fault detector circuit provides the first detection signal, and/or if the ground current fault detector circuit provides the second detection signal.

23. A method for ground fault circuit interrupt ("GFCI") detection for use with an AC power system that includes a line conductor, a neutral conductor and a transformer, the line conductor and the neutral conductor each coupled between a source and a load, the neutral conductor coupled to ground at the source, wherein the transformer includes a first primary winding coupled in series with the line conductor, a second primary winding coupled in series with the neutral conductor, and a secondary winding, the method comprising:
(a) for a first predetermined time interval:
(i) monitoring a current in the secondary winding, and
(ii) providing a first detection signal if the monitored secondary current exceeds a first predetermined threshold; and
(b) for a second predetermined time interval:
(i) driving the secondary winding with a multi-frequency AC voltage or current;
(ii) monitoring a multi-frequency load current in or multi-frequency voltage across the secondary winding;
(iii) mixing the multi-frequency AC voltage or current with the monitored multi-frequency load current or voltage in a mixer circuit to generate a processed signal;
(iv) extracting a DC signal from the processed signal; and
(v) providing a second detection signal if the extracted DC signal is less than a second predetermined threshold.

24. The method of claim 23, further comprising iteratively repeating step (a) and then step (b).

25. The method of claim 23, further comprising interrupting power in the AC power system in response to the first detection signal and/or the second detection signal.

26. The method of claim 23, wherein the first predetermined time interval is between about 1 and 560 milliseconds.

27. The method of claim 23, wherein the first predetermined time interval is about 100 milliseconds.

28. The method of claim 23, wherein the second predetermined time interval is between about 0.1 and 17 milliseconds.

29. A ground fault circuit interrupt ("GFCI") device for use with an AC power system that includes a line conductor, a neutral conductor, a first transformer, and a second transformer, the line conductor and the neutral conductor each coupled between a source and a load, the neutral conductor coupled to ground at the source, wherein the first transformer includes a first primary winding coupled in series with the line conductor, a second primary winding coupled in series with the neutral conductor, and a secondary winding, the second transformer includes a first primary winding coupled in series with the neutral conductor, and a secondary winding, the device comprising:
a multi-frequency signal driver circuit coupled to the secondary winding of the second transformer, wherein the multi-frequency signal driver circuit drives the secondary winding of the second transformer with a multi-frequency AC signal;
a grounded neutral fault detector circuit coupled to the secondary winding of the first transformer, wherein the grounded neutral fault detector circuit includes: (a) a detector circuit that monitors a multi-frequency load signal in the secondary winding of the first transformer, (b) a mixer circuit that processes the multi-frequency AC signal with the monitored multi-frequency load signal to generate a processed signal, (c) a circuit that extracts a DC signal from the processed signal, and (d) a processor that provides a first detection signal if the extracted DC signal exceeds a predetermined threshold.

30. The GFCI device of claim 29, wherein the multi-frequency AC signal comprises a multi-frequency AC voltage signal.

31. The GFCI device of claim 29, wherein the multi-frequency AC signal comprises a multi-frequency AC current signal.

32. The GFCI device of claim 29, wherein the multi-frequency AC signal comprises M intervals, with a corresponding unique frequency in each interval.

33. The GFCI device of claim 32, wherein M is greater than or equal to 3.

34. The GFCI device of claim 32, wherein the grounded neutral fault detector circuit provides the first detection signal if the extracted DC signal exceeds the predetermined threshold in at least N of the M intervals, where N is less than or equal to M.

35. The GFCI device of claim 29, wherein the mixer circuit comprises a switched full-wave rectifier mixer to generate the processed signal.

36. The GFCI device of claim 29, further comprising a ground current fault detector circuit coupled to the secondary winding of the first transformer, wherein the ground current fault detector circuit provides a second detection signal if a current in the secondary winding of the first transformer exceeds a predetermined threshold.

37. The GFCI device of claim 36, further comprising an interrupt circuit coupled to the line conductor, wherein the interrupt circuit interrupts power in the AC power system if the grounded neutral fault detector circuit provides the first detection signal, and/or if the ground current fault detector circuit provides the second detection signal.

38. The GFCI device of claim 36, wherein the grounded neutral fault detector circuit and the ground current fault detector circuit comprise the same circuit.

\* \* \* \* \*